US008322658B2

(12) United States Patent
Gershzohn et al.

(10) Patent No.: US 8,322,658 B2
(45) Date of Patent: Dec. 4, 2012

(54) AUTOMATED FIRE AND SMOKE DETECTION, ISOLATION, AND RECOVERY

(75) Inventors: Gary R. Gershzohn, Laguna Hills, CA (US); David J. Finton, Issaquah, WA (US); Oscar Kipersztok, Redmond, WA (US); Dragos D. Margineantu, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 247 days.

(21) Appl. No.: 12/754,262

(22) Filed: Apr. 5, 2010

(65) Prior Publication Data

US 2011/0240798 A1 Oct. 6, 2011

(51) Int. Cl.
*B64D 25/00* (2006.01)

(52) U.S. Cl. .................................................... 244/129.2

(58) Field of Classification Search .................. 244/1 R, 244/129.2, 171.9, 129.1, 118.5, 171.7
See application file for complete search history.

(56) References Cited

U.S. PATENT DOCUMENTS

| | | | | |
|---|---|---|---|---|
| 2,566,235 | A * | 8/1951 | Mathisen | 169/61 |
| 6,995,966 | B2 * | 2/2006 | Zansky et al. | 361/103 |
| 7,331,401 | B2 * | 2/2008 | Bobenhausen | 169/46 |
| 2005/0178539 | A1 | 8/2005 | Rotta et al. | |
| 2006/0273223 | A1 * | 12/2006 | Haaland et al. | 244/129.2 |
| 2007/0103325 | A1 | 5/2007 | Wagner et al. | |
| 2008/0106437 | A1 | 5/2008 | Zhang et al. | |

FOREIGN PATENT DOCUMENTS

WO 9320544 10/1993

OTHER PUBLICATIONS

International Search Report and Written Opinion in PCT/US2011/027018 dated May 27, 2011.
"Arc Fault Circuit Interrupter" Wikipedia; http://en.wikipedia.org/wiki/Arc-fault_circuit_interrupter; accessed Jun. 3, 2011.
"Arc Fault Circuit Interrupter (AFCI) Fact Sheet" http://www.cpsc.gov/cpscpub/pubs/afcifac8.pdf; accessed Jun. 3, 2011.
Beall et al., AUBE '01 12th International Conference on Automatic Fire Detection; Mar. 25-28, 2001; National Institute of Standards and Technology.
"FedEx Express Advances In-Flight Safety with Automatic Fire Suppression System" Oct. 6, 2009 http://news.van.fedex.com/firesupp.
"Aircraft Fire Extinguishing Systems" SKYbrary Wiki: http://www.skybrary.aero/index.php/Aircraft_Fire_Extinguishing_Systems; accessed Jun. 6, 2011.

* cited by examiner

*Primary Examiner* — Timothy D Collins
*Assistant Examiner* — Nicholas McFall
(74) *Attorney, Agent, or Firm* — Hope Baldauff Hartman, LLC

(57) ABSTRACT

Technologies are described herein for detecting and recovering from a fire event within an aircraft. The technologies receive sensor data from a number of sensors associated with an aircraft. A determination is made as to whether the sensor data exceeds predefined thresholds indicating the fire event within the aircraft. In response to determining that the sensor data exceeds the predefined thresholds indicating the fire event, the technologies determine a location of the fire event within the aircraft based on the sensor data and depower components of the aircraft associated with the fire event. The technologies then initiate a fire suppressant mechanism within the aircraft directed to the location of the fire event.

20 Claims, 3 Drawing Sheets

AUTOMATED FIRE AND SMOKE DETECTION, ISOLATION, AND RECOVERY

BACKGROUND

Although not a common occurrence, fire or smoke within aircraft cabins can be very dangerous. In some cases, the fire or smoke can even be lethal. In particular, fire or smoke can be lethal when (1) the flight crew cannot locate the source of the fire and suppress the fire and (2) the aircraft is too far from an airport to make an immediate landing to obtain assistance from a fire department.

Aircraft cabins often have multiple hidden areas (e.g., behind walls, in the ceiling, below the floor, etc.) that are not in direct view of flight crew (e.g., pilots, cabin crew, etc.) and passengers. As a result, the flight crew and passengers may have difficulty detecting or even identifying the source of fire or smoke that originates from such hidden areas. Any significant delay in detecting and identifying the source of fire or smoke in the aircraft cabin can lead to extremely hazardous conditions for the flight crew and passengers. For example, fire may damage critical components of the aircraft, and inhaling smoke and fumes may affect the health of the flight crew and passengers.

Humans typically detect fire or smoke through the use of visual and olfactory senses. For example, humans can visually perceive fire or smoke. However, the fire or smoke must reach a certain magnitude (e.g., density, thickness, etc.) before the fire or smoke is visually perceivable by humans. That is, in the initial stages of a fire, the smoke may be light and wispy, thereby making the location of the fire difficult to pinpoint. By the time the fire or smoke has reached a visually perceivable magnitude, the fire or smoke may have already reached dangerous levels. Further, if the fire or smoke originates from a hidden area, then the fire or smoke may not be visually perceptible until the fire or smoke has perilously spread past the hidden area.

Humans can also smell smoke, which may indicate the presence of a fire. However, the use of smell is generally limited to detecting that smoke exists as well as the magnitude and changes in magnitude of the smoke. Smell cannot specifically identify the source of the smoke nor the direction from which the smoke originates. In order to aid in the manual detection of smoke, aircraft can be equipped with smoke detectors.

Conventionally, only a limited portion of an aircraft is equipped with smoke detectors. These portions of the aircraft typically include avionics compartments, lavatories, cargo compartments, and crew rest quarters. In other portions of the aircraft, fire or smoke can only be detected by human sight and smell. If the flight crew can identify the source of the fire or smoke, then the flight crew can utilize portable fire extinguishers on the aircraft 100 to suppress any corresponding fire or smoke, assuming the flight crew can gain access to the source. If the flight crew cannot identify the source of the fire or smoke, then the flight crew initiates a checklist procedure.

Historically, aircraft manufacturers and airlines provided the flight crew with a very long and detailed checklist containing multiple troubleshooting steps. For example, in order to detect an electrical fire caused by a short circuit, the checklist may direct the flight crew to depower (e.g., turn off, disable, etc.) various components of the electrical system. In this way, the flight crew can identify the components of the electrical system that caused the electrical fire because the fire will dissipate when the relevant components are depowered. Although the long and detailed checklist is a complete or near complete solution for identifying the source of the fire or smoke, this long and detailed checklist is relatively complicated, requires substantial training, is subject to human error, and is relatively time consuming to complete. For example, while performing the checklist, the flight crew may mistakenly depower critical components of the aircraft that should not be depowered.

In order to eliminate the complexity of the long and detailed checklist, reduce the potential for human error, and reduce the amount of time needed to complete the checklist, the aircraft manufacturers and airlines developed a shortened checklist. This shortened checklist was developed based on an observation that most fire or smoke events within aircraft cabins were caused by only a few possibilities. For example, the majority of electrical based fires on aircraft are produced by air conditioning units that pump warm and cold air into the aircraft cabins and by fans that circulate the air within the aircraft cabins. However, if the source of the fire or smoke is not covered by the shortened checklist, then the source of the fire or smoke may not be identified. In this case, the aircraft may need to make an emergency landing, assuming that an airport is even readily available. In the worst case scenario where the source of the fire cannot be determined or suppressed and an airport is not readily available, the aircraft may be lost in the fire.

It is with respect to these and other considerations that the disclosure made herein is presented.

SUMMARY

Technologies are described herein for detecting, isolating, and recovering from fire or smoke events within an aircraft or aircraft cabin. The aircraft is equipped with various sensors that detect conditions of a fire or smoke event. Through the utilization of intelligent algorithms, the technologies can determine the source of the fire or smoke based on sensor data. The technologies can then isolate and depower components of the aircraft as necessary and automatically suppress the fire or smoke without human interaction.

According to one aspect presented herein, various technologies provide for detecting and recovering from a fire event within an aircraft. The technologies receive sensor data from a number of sensors associated with an aircraft. A determination is made as to whether the sensor data exceeds predefined thresholds indicating the fire event within the aircraft. In response to determining that the sensor data exceeds the predefined thresholds indicating the fire event, the technologies determine a location of the fire event within the aircraft based on the sensor data and depower components of the aircraft associated with the fire event. The technologies then initiate a fire suppressant mechanism within the aircraft directed to the location of the fire event.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for detecting, isolating, and recovering from fire or smoke events within an aircraft or aircraft cabin. In particular, some embodiments provide an intelligent diagnosis and recovery system that detects the onset of a cabin fire or smoke event and locates the source of the cabin fire or smoke event. In the case of an electrical based fire, the intelligent diagnosis and recovery system also depowers components that are the ignition source of the fire. The intelligent diagnosis and recovery system then administers corrective actions, such as suppressing the fire.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
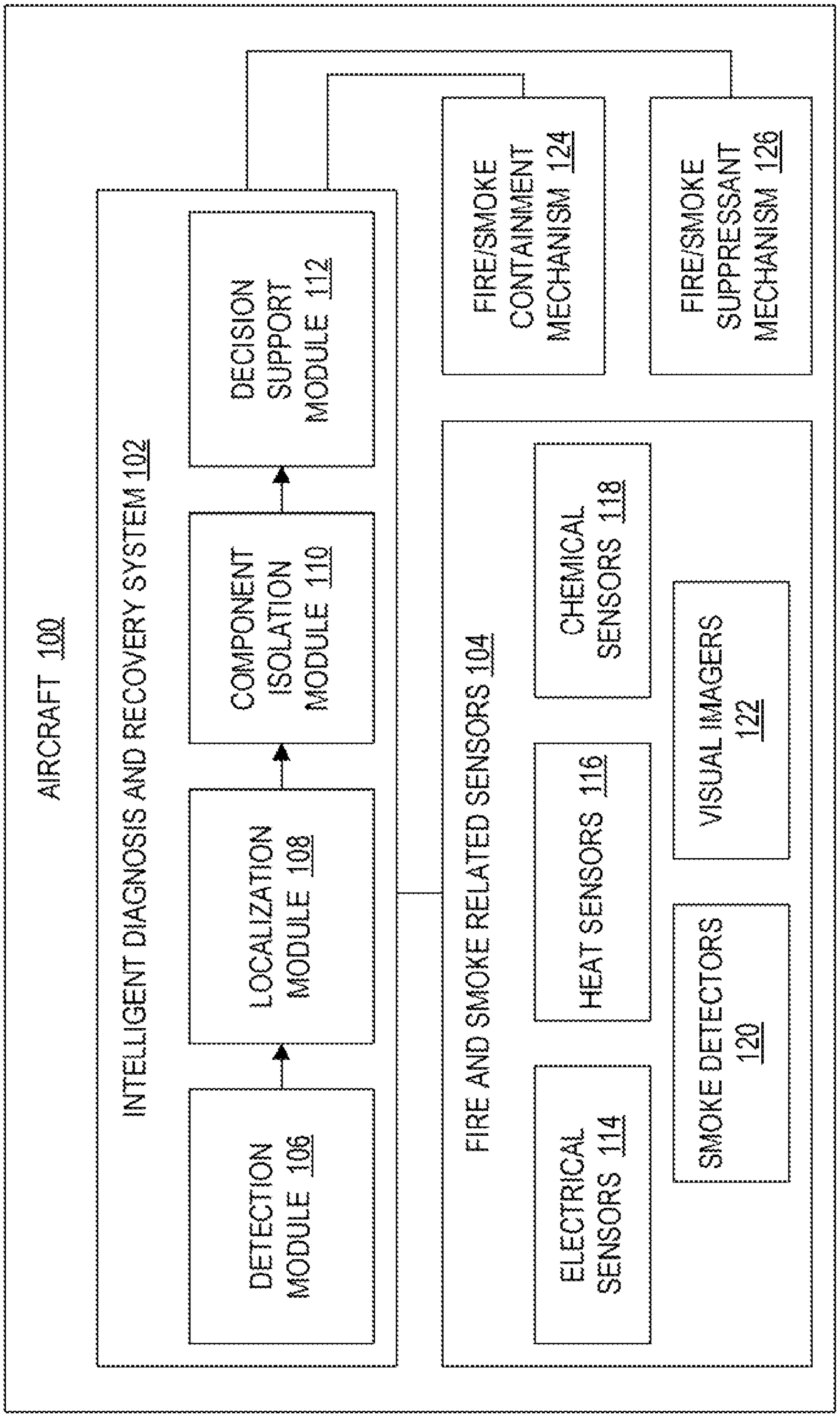
FIG. 1 is a block diagram showing an illustrative aircraft equipped with an intelligent diagnosis and recovery system configured to detect, isolate, and recover from a fire or smoke event within an aircraft or aircraft cabin, in accordance with some embodiments.

In the following detailed description, references are made to the accompanying drawings that form a part hereof, and which are shown by way of illustration, specific embodiments, or examples. Referring now to the drawings, in which like numerals represent like elements through the several figures, aspects of a computing system and methodology for detecting, isolating, and recovering from fire or smoke events within an aircraft or aircraft cabin will be described. In particular, FIG. 1 shows an aircraft 100 having a fuselage and at least one wing. The aircraft 100 is equipped with an intelligent diagnosis and recovery system 102 coupled to a plurality of fire and smoke related sensors 104, in accordance with some embodiments. The intelligent diagnosis and recovery system 102 includes a detection module 106, a localization module 108, a component isolation module 110, and a decision support module 112. The fire and smoke related sensors 104 include one or more of electrical sensors 114, heat sensors 116, chemical sensors 118, smoke detectors 120, and visual imagers 122. It will be appreciated that the fire and smoke related sensors 104 may include other suitable sensors. The intelligent diagnosis and recovery system 102 is further coupled to a fire/smoke containment mechanism 124 and a fire/smoke suppressant mechanism 126, which will be described in further detail below.

The electrical sensors 114 detect shorts and malfunctions in the electrical system of the aircraft 100. Examples of the electrical sensors 114 include, but are not limited to, circuit breakers and arc-fault detectors, which sense improper current on a wire. The heat sensors 116 continuously measure temperature and detect sudden increases in temperature. In this way, the heat sensors 116 can detect excessive heat that would normally be associated with a fire. Examples of the heat sensors 116 include, but are not limited to, thermocouples and thermistors. A distributed set of the heat sensors 116 throughout the aircraft 100 may provide spatial and temporal distribution of temperature. Models based on the heat conduction equation may be utilized to estimate starting position, starting time, and intensity of the source of heat.

The chemical sensors 118 detect the presence and movement of atmospheric constituents, such as fuel fumes and hazardous chemical fumes, and other released substances related to fires and electrical faults. In some cases, these released substances may include atmospheric constituents from a fire that are released after the fire has started, thereby aiding in the detection of the fire. In other cases, these released substances may include atmospheric constituents from flammable and otherwise potentially-dangerous chemicals that are released before the fire has started, thereby aiding in the detection of the chemical leak and the prevention of a potential fire. Examples of potentially-dangerous chemicals include sodium and chlorine, which, when combined in the proper proportions and exposed to water, can result in an exothermic (i.e., a very, very high temperature) reaction. The chemical sensors 118 may be installed near wire bundles in cargo or other suitable compartments of the aircraft 100 where such atmospheric constituents are likely to form. A distributed set of chemical sensors 118 throughout the aircraft 100 may provide spatial and temporal distribution of released substances.

The smoke detectors 120 detect the presence and movement of smoke. Sets of the smoke detectors 120 may be distributed throughout the cabin of the aircraft 100 to measure diffusion of smoke. Suitable diffusion equations and methodologies may be utilized to localize the source based on the dynamics and density of smoke measured by the smoke detectors 120.

The visual imagers 122 provide visual feedback of fire or smoke to the flight crew. Examples of the visual imagers 122 include, but are not limited to, video camera and infrared cameras, such as Forward Looking Infrared ("FLIR") cameras. The visual data recorded by the visual imagers 122 may be displayed through a suitable display within the aircraft 100. The visual imagers 122 may be installed in different sections throughout the aircraft 100 to provide the flight crew with the capability to monitor and retrieve on-demand images and video of the fire or smoke location. The flight crew may utilize the visual data from the visual imagers 122 to verify the presence of fire or smoke, as well as to verify the success of any corrective actions that are taken to suppress the fire or smoke. For example, the visual imagers 122 may enable the flight crew to cycle through multiple video feeds at different sections of the aircraft 100. In some cases, suitable pattern recognition algorithms and methodologies may be utilized to automatically process and analyze the visual data.

Generally, the fire and smoke related sensors 104 should be distributed such that fire or smoke originating in relevant visible or non-visible (i.e., hidden) areas of the aircraft 100 can be properly detected. In particular, the placement of the sensors within the cabin and other compartments of the aircraft 100 may be optimized in accordance with predefined functions and goals. In order to reduce cost, a minimal number of the fire and smoke related sensors 104 that can adequately achieve these functions and goals may be selected and installed. Examples of the predefined functions goals include, but are not limited to, ensuring (a) sufficient signal-to-noise ratios and measurement resolution (i.e., the granularity at which an attribute can be measured) such that corresponding data can be fitted into mathematical models utilized by intelligent diagnosis and recovery system 102, (b) redundancy in case of sensor failures, (c) minimal added weight and minimal energy utilization of the sensors, (d) fast execution of real-time and near real-time detection and localization algorithms performed by the detection module 106 and the localization module 108, respectively.

Operation of the intelligent diagnosis and recovery system 102 begins with the detection module 106. The detection module 106 monitors sensor data collected by the fire and smoke related sensors 104 in real-time or near real-time. When the sensor data collected by one or more of the fire and smoke related sensors 104 exceeds predefined thresholds, the detection module 106 identifies a potential fire or smoke event. The operation of the intelligent diagnosis and recovery system 102 then proceeds to the localization module 108.

The localization module 108 receives the sensor data from the detection module 106 or from the fire and smoke related sensors 104 and may employ suitable localization algorithms to determine the source position and/or the start time of the fire or smoke. The localization module 108 may also employ probabilistic algorithms based on intensity of the sensor data to estimate the dynamic progression of a fire or smoke event. As used herein, the term "localization data" refers to the data determined by the localization module 108. The localization data includes the source position of the fire or smoke, the start time of the fire or smoke and/or the estimated dynamic progression of the fire or smoke.

In one embodiment, the localization module 108 utilizes triangulation of the relevant fire and smoke related sensors 104 to determine the source position of the fire. In another embodiment, the localization module 108 utilizes suitable correlation methods of the sensor data collected by the relevant and smoke related sensors 104 to determine the source position of the fire. In an illustrative example, the cross correlation function between continuous measurements of two sensors placed along the direction of smoke propagation can provide estimates of the time delay and direction of the smoke as it moves between the first and second sensor. Assuming a constant speed of smoke propagation, which is reasonable along an air duct, for example, this idea can be extended to multiple sensors placed in a distributed manner in the duct. Each pair of sensors can give an estimate of the direction and vector component of smoke propagation speed along the line between the two sensors. Through interpolation of the magnitude and direction of those vectors, the location of the source of the smoke can be determined.

In yet another embodiment, the localization module 108 determines the source position and/or the start time by means of a set of mathematical models utilizing the heat conduction equation, the diffusion equation, pattern recognition algorithms, intelligent search strategies, and intelligent graphics methods. In an example of a pattern recognition algorithm, fumes from different materials may have different physical and chemical characteristics (e.g. diffusion speeds, chemicals, colors, etc.). The ability to recognize those characteristic patterns may give early indication to identify the source of the fumes. Examples of pattern matching algorithms may include the use of neural networks, Bayesian classifiers, and the like.

An example of the search strategies includes, but is not limited to, using a Circuit Breaker Indication and Control System ("CBIC") for localizing the problem source while minimizing the cycling (i.e., the pulling and resetting) of circuit breakers. In cases where fumes or smoke may be due to electrical shorts occurring in sections of wire bundles, it may be critical to be able to pinpoint the location of the short in several tens of miles of wires. Intelligent search strategies may include the shutting down of circuit breakers in specific order to minimize the number of steps to localize the damage.

An example of the intelligent graphics methods includes, but is not limited to, using wire diagrams to determine the source location of a fire caused by shorts or arc faults in wire bundles. Advanced "intelligent graphics" algorithms can render wire diagrams in electronic form. When the wire diagrams are in electronic form, one can identify the wires that are affected when, for example, a particular switch is activated. With this capability, one can also identify the cascading effect of specific failures (e.g. what wires will be affected if a suspected switch was damaged). Combining the capability of search methods with intelligent graphics may reduce the time it takes to isolate a wire related problem.

As an illustrative example, the start time of fire or smoke may be determined as follows. Solutions to the diffusion equation can predict the density (or the heat) of the diffusing material in a specific location at a specific time. Taking measurements of smoke or heat propagation and comparing those measurements to a specific solution of the diffusion equation can help "back out," based on the predictive model, when the source of the smoke may have started to produce the smoke.

Upon determining the source position and/or the start time of the fire or smoke, the localization module 108 may activate the fire/smoke containment mechanism 124 on the aircraft 100. In some embodiments, the fire/smoke containment mechanism 124 performs actions to prevent the fire or smoke from spreading beyond a designated area. For example, the fire/smoke containment mechanism 124 may change the airflow within the aircraft 100 to direct fire or smoke away from people or dangerous goods (e.g., explosives, corrosives, etc.). In some other embodiments, the fire/smoke containment mechanism 124 reduces the airflow to a given area. For example, if a fire is suspected or known to exist in a cargo airplane, the fire/smoke containment mechanism 124 may completely depressurize the aircraft 100. In contrast to the fire/smoke suppressant mechanism 126, the fire/smoke containment mechanism 124 does not release a fire suppressing agent to extinguish the fire or smoke. The operation of the intelligent diagnosis and recovery system 102 then proceeds to the component isolation module 110.

The component isolation module 110 also receives the sensor data from the detection module 106 or directly from the fire and smoke related sensors 104. The component isolation module 110 then computes suspected causes of the fire or smoke based on the sensor data and produces estimates of the probability of failure for individual components (e.g., electrical components) within the aircraft 100. Model based and graphical probabilistic diagnosis methods can be utilized to model component dependencies in the electrical system of the aircraft 100. The cascading effect from an electrical component breakdown due to failure or current interruption can be explicitly modeled. The component isolation module 110 may compute the suspected causes of the fire or smoke utilizing such models.

The graphical probabilistic methods, also known as Bayesian networks, can be used to create or learn probabilistic diagnostic models. These models can identify the most probable failed components given a set of symptoms or observations. Pilots can observe symptoms of problems in the form of Flight Deck Effects ("FDEs"). Other observable quantities, such as unusual odors or sounds, can be used. If a fire starts and spreads, the fire is likely to create damage that will trigger the occurrence of FDEs. The component isolation module 110, utilizing the diagnostic models, can continuously provide a list of the implicated failed components that can explain the symptoms. Knowledge of what the possible failed components are and their location can help narrow down the location of the fire.

The component isolation module 110 may utilize intelligent prioritization scheme and diagnosis algorithms to isolate and depower relevant components. For example, the probability estimates of the possible failed components given by the component isolation module 110 can be used to rank the possible causes from the most probable to the least probable. As part of the process for finding the location of the fire, further fault isolation tests can be conducted in the order of the most probable likely causes. The component isolation module 110 may depower electrical components that (a) caused the fire or smoke, (b) fuel or worsen the fire or smoke, or (c) have been damaged by the fire or smoke. The relevant components may be isolated in accordance with inference methods using a combination of relational and conditional probability update algorithms. When multiple components are associated with a given symptom, estimates of probability of failure can be made from Bayesian methods to rank the implicated components.

The component isolation module 110 may automatically depower non-critical components (i.e., components deemed unnecessary to the proper and safe operation of the aircraft 100). The component isolation module 110 may depower critical components (i.e., components deemed necessary to the proper and safe operation of the aircraft 100) only upon receiving permission from the flight crew (e.g., the pilot). The component isolation module 110 may dynamically identify non-critical components and critical components based on aircraft status, surrounding weather, phase of flight, and/or knowledge of aircraft future position. The operation of the intelligent diagnosis and recovery system 102 then proceeds to the decision support module 112.

The decision support module 112 performs automated actions to suppress the fire or smoke as localized in the localization data from the localization module 108. The decision support module 112 also provides recommended response actions and feedback to the flight crew. The decision support module 112 activates the fire/smoke suppressant mechanism 126. In some embodiments, the fire/smoke suppressant mechanism 126 is routed through the cabin of the aircraft 100 and releases a suitable fire suppressing agent (e.g., halon, inert gas, water, etc.) directly onto the fire or smoke. The fire/smoke suppressant mechanism 126 is designed to reach visible and/or non-visible areas of the aircraft 100.

If the fire/smoke suppressant mechanism 126 is activated by the electrical system of the aircraft 100, then the decision support module 112 may provide feedback to the flight crew when the decision support module 112 activates the fire/smoke suppressant mechanism 126. However, when the fire/smoke suppressant mechanism 126 is tied to the electrical system, the decision support module 112 may fail to activate the fire/smoke suppressant mechanism 126 if the fire or smoke damages the electrical system. In this case, the fire/smoke suppressant mechanism 126 may operate independently of electrical power and computer control. For example, the fire/smoke suppressant mechanism 126 may utilize a system of small tubes running throughout the aircraft 100. These small tubes may contain halon or other fire suppressing agent and may be adapted to melt at a temperature indicative of a fire or smoke event. Thus, when the fire or smoke event melts the small tubes, the fire suppressing agent is subsequently released.

When the fire/smoke suppressant mechanism 126 is not tied to the electrical system of the aircraft 100, the flight crew is not provided with a notification when the fire/smoke suppressant mechanism 126 is activated. In this case, the flight crew may utilize updated sensor data from the fire and smoke related sensors 104 to verify that the fire or smoke has been suppressed. In one example, the heat sensors 116, the chemical sensors 118, and/or the smoke detectors 120 may detect a reduction in the intensity of conditions related to the fire or smoke event. In another example, the flight crew may view real-time or near real-time video feeds of the source of the fire or smoke. In this way, the flight crew can visually verify that the fire or smoke has been suppressed. Pattern recognition algorithms may also be utilized to automatically verify that the fire or smoke has been suppressed.

Figure 2:
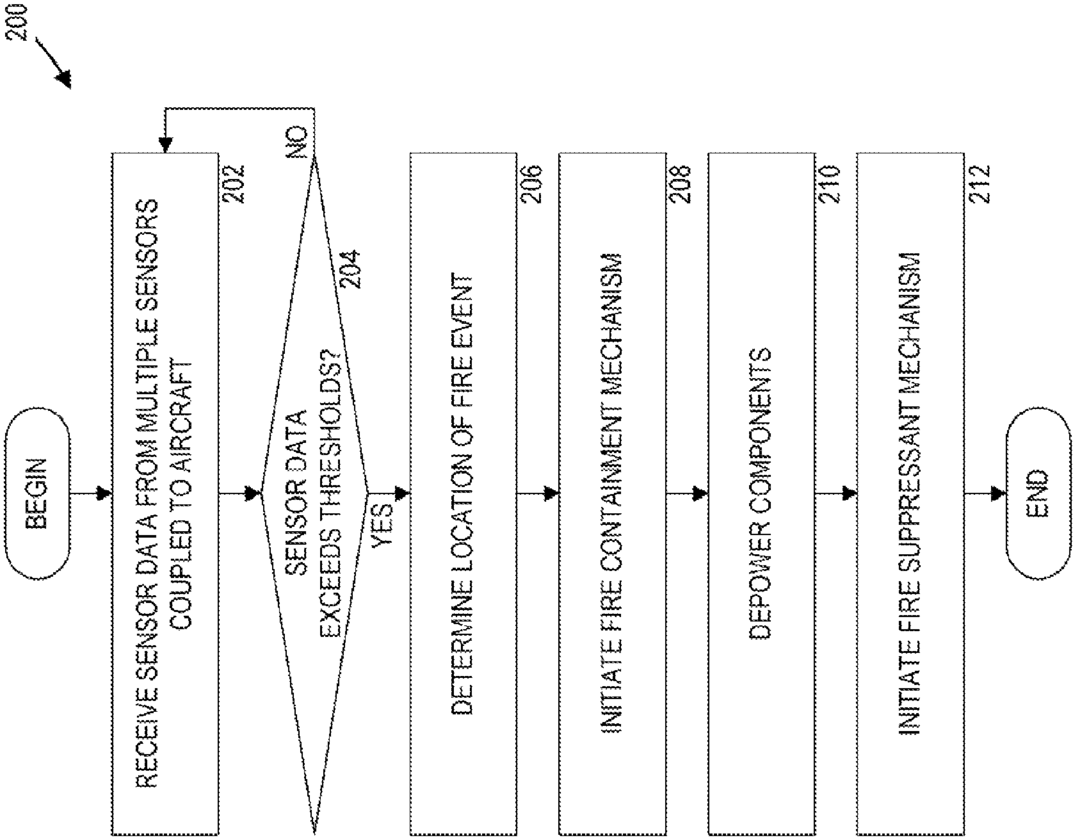
FIG. 2 is flow diagram illustrating aspects of an example method provided herein for detecting, isolating, and recovering from fire or smoke events within an aircraft or aircraft cabin, in accordance with some embodiments.

Referring now to FIG. 2, additional details will be provided regarding the operation of the intelligent diagnosis and recovery system 102. In particular, FIG. 2 is a flow diagram illustrating aspects of an example method provided herein for detecting, isolating, and recovering from fire or smoke events within an aircraft or aircraft cabin, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

As shown in FIG. 2, a routine 200 begins at operation 202, where the detection module 106 receives sensor data from the fire and smoke related sensors 104. The sensor data may include electrical data from the electrical sensors 114, temperature data from the heat sensors 116, chemical data from the chemical sensors 118, smoke data from the smoke detectors 120, and visual data from the visual imagers 122. The routine 200 then proceeds to operation 204, where the detection module 106 determines whether the sensor data exceeds predefined thresholds indicating the possibility of a fire or smoke event. The predefined thresholds may apply to sensor data from individual sensors or sensor data from various combinations of sensors. The predefined thresholds may be configured such that when the sensor data exceeds the predefined threshold, the sensor data indicates that a fire or smoke event is likely occurring.

If the detection module 106 determines that the sensor data does not exceed the predefined thresholds, then the routine 200 returns to operation 202, where the detection module 106 continues to receive and monitor the sensor data. If the detection module 106 determines that the sensor data exceeds the predefined thresholds, then the routine 200 proceeds to operation 206, where the localization module 108 determines the location of the fire or smoke event based on the sensor data. For example, the localization module 108 may determine the location of the fire or smoke event by triangulating the relevant sensors gathering the sensor data.

At operation 208, the localization module 108 initiates the fire/smoke containment mechanism 124. For example, the fire/smoke containment mechanism 124 may change the airflow within the aircraft 100 to direct fire or smoke away from people or dangerous goods. At operation 210, the component isolation module 110 also depowers components associated with the fire or smoke event. In particular, the component isolation module 110 may depower electrical components causing the fire or smoke event, as well as electrical components damaged by the fire or smoke event. Upon determining the location of the fire or smoke event, initiating the fire/smoke containment mechanism 124, and depowering any relevant electrical components, the routine 200 proceeds to operation 212, where the decision support module 112 initiates the fire/smoke suppressant mechanism 126, which releases a fire suppressing agent at the location of the fire or smoke event. The fire/smoke suppressant mechanism 126 may or may not be electrically activated.

Figure 3:
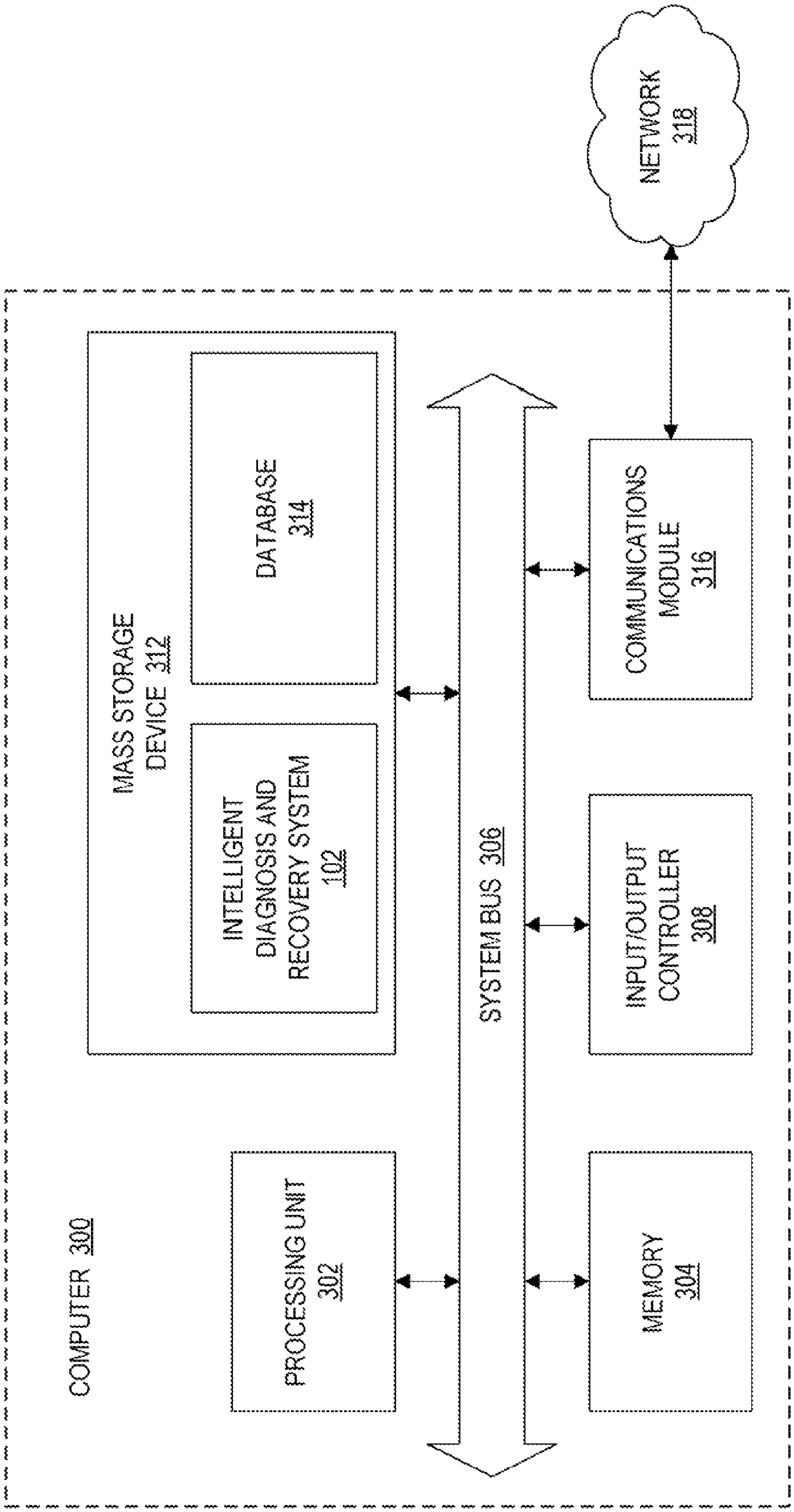
FIG. 3 is a computer architecture diagram showing aspects of an illustrative computer hardware architecture for a computing system capable of implementing aspects of the embodiments presented herein.

Referring now to FIG. 3, an example computer architecture diagram showing aspects of a computer 300 is illustrated. The computer 300 may be configured to execute at least portions of the intelligent diagnosis and recovery system 102. The computer 300 includes a processing unit 302 ("CPU"), a system memory 304, and a system bus 306 that couples the memory 304 to the CPU 302. The computer 300 further includes a mass storage device 312 for storing one or more program modules, such as the intelligent diagnosis and recovery system 102, and one or more databases 314. The mass storage device 312 is connected to the CPU 302 through a mass storage controller (not shown) connected to the bus 306. The mass storage device 312 and its associated computer-readable media provide non-volatile storage for the computer 300. Although the description of computer-readable media contained herein refers to a mass storage device, such as a hard disk or CD-ROM drive, it should be appreciated by those skilled in the art that computer-readable media can be any available computer storage media that can be accessed by the computer 300.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 300.

According to various embodiments, the computer 300 may operate in a networked environment using logical connections to remote computers through a network 318. The computer 300 may connect to the network 318 through a network interface unit 316 connected to the bus 306. It should be appreciated that other types of network interface units may also be utilized to connect to other types of networks and remote computer systems. The computer 300 may also include an input/output controller 308 for receiving and processing input from a number of input devices (not shown), including a keyboard, a mouse, and a microphone. Similarly, the input/output controller 308 may provide output to a display or other type of output device (not shown) connected directly to the computer 300.

Based on the foregoing, it should be appreciated that technologies for detecting, isolating, and recovering from fire or smoke events within an aircraft or aircraft cabin are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for detecting and recovering from a fire event within an aircraft, the method comprising:
- receiving sensor data associated with fire or smoke from a plurality of sensors associated with the aircraft;
- determining whether the sensor data exceeds predefined thresholds indicating the fire event within the aircraft;
- in response to determining that the sensor data exceeds the predefined thresholds indicating the fire event, determining a location of the fire event within the aircraft based on the sensor data;
- isolating and depowering electrical components of the aircraft associated with the fire event; and
- initiating a fire suppressant mechanism within the aircraft directed to the location of the fire event.

2. The method of claim 1, wherein receiving sensor data from a plurality of sensors associated with an aircraft comprises at least one of receiving electrical data from electrical sensors, receiving temperature data from heat sensors, receiving chemical data from chemical sensors, receiving smoke data from smoke sensors, and receiving visual data from visual imagers.

3. The method of claim 1, wherein determining a location of the fire event within the aircraft based on the sensor data comprises determining the location of the fire event within the aircraft based on triangulation of the plurality of sensors gathering the sensor data.

4. The method of claim 1, further comprising:
- in response to determining that the sensor data exceeds the predefined thresholds indicating the fire event, initiating a fire containment mechanism that prevents the fire event from spreading beyond a designated area.

5. The method of claim 4, wherein initiating a fire containment mechanism that prevents the fire event from spreading beyond a designated area comprises changing airflow within the aircraft to direct the fire event away from people or dangerous goods.

6. The method of claim 1, wherein depowering components of the aircraft associated with the fire event comprises:
- isolating electrical components of the aircraft causing the fire event; and
- depowering the electrical components of the aircraft causing the fire event.

7. The method of claim 1, wherein isolating and depowering components of the aircraft associated with the fire event comprises:
- isolating electrical components of the aircraft damaged by the fire event;
- determining whether the electrical components are critical to safe operation of the aircraft.

8. The method of claim 7, further comprising:

in response to determining that the electrical components are critical to safe operation of the aircraft, requesting permission from flight crew to depower the electrical components; and upon receiving the permission from the flight crew to depower the electrical components, depowering the electrical components damaged by the fire event.

9. The method of claim 7, wherein determining whether the electrical components are critical to safe operation of the aircraft comprises determining whether the electrical components are critical to safe operation of the aircraft based on aircraft status, surrounding weather, phase of flight, and knowledge of aircraft future position.

10. The method of claim 1, wherein the fire suppressant mechanism, upon initiation, releases a fire suppressing agent directed to the location of the fire event.

11. The method of claim 1, further comprising:

verifying initiation of the fire suppressant mechanism based on updated sensor data from the plurality of sensors.

12. An aircraft fire detection and recovery system, comprising:

a plurality of sensors associated with an aircraft;

a fire suppressant mechanism adapted to release a fire suppressing agent, the fire suppressant mechanism coupled to the aircraft;

a detection module receiving sensor data associated with fire or smoke from the plurality of sensors and identifying a fire event within the aircraft when the sensor data exceeds predefined thresholds indicating the fire event within the aircraft;

a localization module receiving the sensor data from the plurality of sensors and determining a location of the fire event within the aircraft based on the sensor data;

an electrical component isolation module depowering electrical components of the aircraft associated with the fire event and initiating a fire containment mechanism that prevents the fire event from spreading beyond a designated area; and a decision support module initiating the fire suppressant mechanism to release the fire suppressing agent to the location of the fire event.

13. The system of claim 12, wherein the plurality of sensors comprise electrical sensors adapted to detect shorts and arc faults in an electrical system of the aircraft.

14. The system of claim 13, wherein the plurality of sensors further comprise heat sensors adapted to continuously measure temperature within the aircraft and detect sudden increases in temperature indicating the fire event.

15. The system of claim 14, wherein the plurality of sensors further comprise chemical sensors adapted to detect atmospheric constituents from the fire event that are released after the fire event has started and atmospheric constituents from chemicals that are leaked before the fire event has started.

16. The system of claim 15, wherein the plurality of sensors further comprise visual imagers adapted to capture video of visible and non-visible areas of the aircraft and smoke detectors adapted to detect smoke in the aircraft.

17. The system of claim 12, wherein the fire suppressant mechanism is electrically activated by the decision support module.

18. The system of claim 12, wherein the fire suppressant mechanism is non-electrically activated.

19. The system of claim 18, wherein the fire suppressant mechanism comprises a plurality of tubes containing a fire suppressing agent, the plurality of tubes releasing the fire suppressing agent when temperature of the fire event melts the plurality of tubes.

20. An aircraft comprising:

a plurality of a sensors coupled to the aircraft, the plurality of sensors comprising (a) electrical sensors adapted to detect shorts and arc faults in an electrical system of the aircraft, (b) heat sensors adapted to continuously measure temperature within the aircraft and detect sudden increases in temperature indicating a fire event in the aircraft, (c) chemical sensors adapted to detect atmospheric constituents from the fire event that are released after the fire event has started and atmospheric constituents from chemicals that are leaked before the fire event has started, (d) visual imagers adapted to capture video of visible and non-visible areas of the aircraft, and (e) smoke detectors adapted to detect smoke in the aircraft;

a fire suppressant mechanism adapted to release a fire suppressing agent, the fire suppressant mechanism coupled to the aircraft;

a detection module receiving sensor data associated with fire or smoke from the plurality of sensors and identifying the fire event within the aircraft when the sensor data exceeds predefined thresholds indicating the fire event within the aircraft;

a localization module receiving the sensor data from the plurality of sensors and determining a location of the fire event within the aircraft based on the sensor data;

an electrical component isolation module depowering electrical components of the aircraft causing the fire event, depowering electrical components of the aircraft damaged by the fire event, and initiating the fire containment mechanism that prevents the fire event from spreading beyond a designated area; and a decision support module initiating the fire suppressant mechanism to release the fire suppressing agent to the location of the fire event.

* * * * *